US012599930B2

(12) United States Patent
Boing et al.

(10) Patent No.: US 12,599,930 B2
(45) Date of Patent: Apr. 14, 2026

(54) ULTRAVIOLET BOTTOM COATING SYSTEM

(71) Applicant: Roeslein & Associates, Inc., St. Louis, MO (US)

(72) Inventors: Stephen Joseph Boing, Dardenne Prairie, MO (US); Nicholas John Marasovich, St. Louis, MO (US); Stanley G. McCrorey, Bonne Terre, MO (US); Allen Wayne Reames, Fairview Heights, IL (US)

(73) Assignee: Roeslein & Associates, Inc., St. Louis, MO (US)

( * ) Notice: Subject to any disclaimer, the term of this patent is extended or adjusted under 35 U.S.C. 154(b) by 98 days.

(21) Appl. No.: 16/673,522

(22) Filed: Nov. 4, 2019

(65) Prior Publication Data

US 2021/0129182 A1 May 6, 2021

(51) Int. Cl.
| | |
|---|---|
| *C03C 25/6226* | (2018.01) |
| *B05C 1/02* | (2006.01) |
| *B05C 1/08* | (2006.01) |
| *B05C 1/14* | (2006.01) |
| *B05C 1/16* | (2006.01) |
| *B05C 9/14* | (2006.01) |
| *B05C 11/10* | (2006.01) |
| *B05D 3/06* | (2006.01) |

(Continued)

(52) U.S. Cl.
CPC .............. *B05D 3/067* (2013.01); *B05C 1/022* (2013.01); *B05C 1/0891* (2013.01); *B05C 1/14* (2013.01); *B05C 1/165* (2013.01); *B05C 9/14*
(2013.01); *B05C 11/1023* (2013.01); *B05D 7/20* (2013.01); *C03C 25/12* (2013.01); *C03C 25/6226* (2013.01)

(58) Field of Classification Search
CPC . B05C 9/14; B05C 13/02; B41M 5/00; B05D 3/067; B05D 3/061
See application file for complete search history.

(56) References Cited

U.S. PATENT DOCUMENTS

| | | | |
|---|---|---|---|
| 4,210,684 A | 7/1980 | Shriver | |
| 4,411,931 A * | 10/1983 | Duong .................... | B29C 59/16 |
| | | | 427/493 |

(Continued)

FOREIGN PATENT DOCUMENTS

| | | |
|---|---|---|
| CN | 1918190 A | 2/2007 |
| WO | 199417925 A1 | 8/1994 |
| WO | 2012109609 A1 | 8/2012 |

OTHER PUBLICATIONS

PCT International Search Report and Written Opinion for Application PCT/US2020/058708 mailed Mar. 11, 2021; 15 pp.

(Continued)

*Primary Examiner* — Karl Kurple
(74) *Attorney, Agent, or Firm* — Stinson LLP

(57) ABSTRACT

An ultraviolet bottom coating system including a conveyor mechanism configured to route a plurality of cans in a machine direction, wherein the plurality of cans each have a bottom surface and uncured coating material applied on the bottom surface. The system also includes at least one ultraviolet light-emitting diode (UV-LED) device configured to emit ultraviolet radiation towards the plurality of cans, wherein the ultraviolet radiation is configured to cure the uncured coating material onto the bottom surface.

13 Claims, 3 Drawing Sheets

(51) Int. Cl.
  *B05D 7/20*     (2006.01)
  *C03C 25/12*    (2006.01)

(56)          References Cited

U.S. PATENT DOCUMENTS

| | | | |
|---|---|---|---|
| 4,587,926 A | | 5/1986 | Dominico |
| 4,828,884 A | * | 5/1989 | Miller ..................... B05C 1/14 |
| | | | 427/284 |
| 5,298,837 A | * | 3/1994 | Diestl .................... H05B 41/18 |
| | | | 315/224 |
| 5,536,316 A | * | 7/1996 | Schultz ................ B05C 13/025 |
| | | | 118/642 |
| 7,345,320 B2 | | 3/2008 | Dahm |
| 7,399,982 B2 | | 7/2008 | Siegel |
| 7,465,909 B2 | | 12/2008 | Siegel |
| 8,314,408 B2 | | 11/2012 | Hartsuiker et al. |
| 8,517,750 B2 | | 8/2013 | Martinez et al. |
| 8,808,811 B2 | | 8/2014 | Kolb et al. |
| 9,067,241 B2 | | 6/2015 | Hartsuiker et al. |
| 9,259,913 B2 | | 2/2016 | Ellefson |
| 9,687,875 B2 | | 6/2017 | Molin et al. |
| 9,724,716 B2 | * | 8/2017 | Khoury .............. B05B 13/0242 |
| 9,751,332 B2 | * | 9/2017 | Zhang ................... B05D 3/067 |
| 9,988,219 B2 | | 6/2018 | Clark et al. |
| 2002/0118541 A1 | * | 8/2002 | Stowell ..................... F26B 3/28 |
| | | | 362/345 |
| 2003/0194433 A1 | * | 10/2003 | Hei ........................ B65G 45/02 |
| | | | 424/465 |
| 2004/0238111 A1 | | 12/2004 | Siegel |
| 2007/0187612 A1 | | 8/2007 | Inoue et al. |
| 2009/0159442 A1 | * | 6/2009 | Collier ..................... B05C 9/12 |
| | | | 204/403.1 |
| 2010/0028558 A1 | * | 2/2010 | Ozawa ................... G11B 7/266 |
| | | | 118/620 |
| 2010/0242299 A1 | | 9/2010 | Siegel |
| 2011/0049392 A1 | | 3/2011 | Martinez et al. |
| 2011/0204261 A1 | | 8/2011 | Dahm et al. |
| 2012/0021134 A1 | | 1/2012 | Kolb et al. |
| 2013/0092847 A1 | * | 4/2013 | Childers ................... F21K 9/60 |
| | | | 250/492.1 |
| 2013/0228122 A1 | * | 9/2013 | Sasaki ...................... B05D 1/02 |
| | | | 118/313 |
| 2014/0002562 A1 | * | 1/2014 | Zhang ................. B05D 3/0209 |
| | | | 206/524.6 |
| 2014/0272161 A1 | * | 9/2014 | Clayton .................. C09D 5/26 |
| | | | 427/424 |
| 2014/0319386 A1 | * | 10/2014 | Dahm .................... B05D 3/067 |
| | | | 250/494.1 |
| 2014/0334137 A1 | | 11/2014 | Hasenoehrl et al. |
| 2015/0167706 A1 | * | 6/2015 | Legros ................ C09D 133/06 |
| | | | 138/145 |
| 2017/0252719 A1 | * | 9/2017 | Berti ..................... B01J 19/123 |
| 2017/0283186 A1 | * | 10/2017 | Clark ................. B65G 21/2072 |
| 2018/0148820 A1 | * | 5/2018 | Komaki ............... B23Q 7/1426 |
| 2019/0151819 A1 | * | 5/2019 | Omae .................... B01J 19/123 |
| 2019/0152247 A1 | * | 5/2019 | Shinohara ............. C09D 11/38 |
| 2020/0165491 A1 | * | 5/2020 | Meier ................... B05D 3/067 |
| 2021/0114047 A1 | * | 4/2021 | Orita ................ H01L 21/67173 |

OTHER PUBLICATIONS

Supplementary European Search Report issued for Application No. 20885787.0, mailed on Oct. 30, 2023 (8 pages).
Office Action received in related application CN2020800765971 on Dec. 14, 2023; 6 pps.

* cited by examiner

ULTRAVIOLET BOTTOM COATING SYSTEM

BACKGROUND

The present disclosure relates generally to coatings in can manufacturing and, more specifically, to systems and methods of curing coatings on a bottom rim surface of a can.

Many known containers, such as metallic cans, that are used to provide food products to consumers are treated with a coating for the purpose of inhibiting corrosion, improving the aesthetic appearance of the container, and improving the handling of containers during a manufacturing process, for example. When used to facilitate improved handling, an example coating may include a rim coat that is applied to the bottom rim surface of the containers. The rim coat improves the handling of the containers by providing a friction-reducing interface for the container as it is routed along a manufacturing line. The rim coat is typically applied to the bottom rim surface in an uncured state, and may then be cured with ultraviolet energy. However, many known ultraviolet energy emitters have inherent drawbacks such as high power consumption, delayed output, limited usable focal length, limited lamp life, and the need for secondary support systems that have a large physical footprint.

BRIEF DESCRIPTION

In one aspect, an ultraviolet bottom coating system is provided. The system includes a conveyor mechanism configured to route a plurality of cans in a machine direction, wherein the plurality of cans each have a bottom surface and uncured coating material applied on the bottom surface. The system also includes at least one ultraviolet light-emitting diode (UV-LED) device configured to emit ultraviolet radiation towards the plurality of cans, wherein the ultraviolet radiation is configured to cure the uncured coating material onto the bottom surface.

In another aspect, an ultraviolet bottom coating system is provided. The system includes a conveyor mechanism configured to route a plurality of cans in a machine direction, wherein the plurality of cans each have a bottom surface. A coating applicator defines a coating zone on the conveyor mechanism, wherein the coating applicator is configured to apply uncured coating material to the bottom surface of the plurality of cans routed through the coating zone. At least one ultraviolet light-emitting diode (UV-LED) device defines a curing zone on the conveyor mechanism that is downstream from the coating zone in the machine direction The at least one UV-LED device is configured to emit ultraviolet radiation towards the plurality of cans to cure the uncured coating material onto the bottom surface.

In yet another aspect, a method of forming a rim coat on a bottom surface of metallic cans is provided. The method includes routing a plurality of cans in a machine direction through a coating zone and then a curing zone, applying uncured coating material to a bottom surface of the plurality of cans routed through the coating zone, and emitting, from at least one ultraviolet light-emitting diode (UV-LED) device, ultraviolet radiation towards the plurality of cans routed through the curing zone. The ultraviolet radiation is configured to cure the uncured coating material onto the bottom surface to form the rim coat.

DETAILED DESCRIPTION

The embodiments described herein relate generally to systems and methods of curing coatings on a bottom rim surface of a can. For example, the system described herein includes a conveyor mechanism and one or more ultraviolet light-emitting diode (UV-LED) devices. The conveyor mechanism receives a plurality of cans that have been shaped from a blank of sheet material on a manufacturing line. A coating zone and a curing zone are defined on the conveyor mechanism, and the cans are routed through each zone to form a rim coat on the bottom surface of each can. Uncured coating material is applied to the bottom surface of the cans routed through the coating zone, and the coating material is then cured onto the bottom surface as the cans are routed through the curing zone. The coating material is cured with ultraviolet radiation emitted from the UV-LED device.

In the exemplary embodiment, the UV-LED device is cooled with fluid, such as water or air. UV-LED devices have many advantages over non-LED air-cooled UV-curing devices. For example, UV-LED devices have a lamp power consumption that is 50-90 percent less than non-LED devices. Also, UV-LED devices have a reduced cooling requirement to non-LED devices which more readily allows cooling with fluid. The reduction in overall power consumption and physical footprint of the system described herein is facilitated by the elimination of air supply equipment such as ducts, housings, filters, blowers, and vacuum instrumentation. In addition, one known drawback of non-LED air-cooled UV-curing devices is the tendency to draw airborne dirt and oil mist into the non-LED equipment, which can damage the equipment and/or reduce its service life between maintenance intervals. Supplying a fluid such as water to the UV-LED device enables cooling of the device in a controlled manner that introduces a reduced amount of contaminants into the system. UV-LED devices also produce an immediate output of ultraviolet radiation when activated, do not require the use of a precise focal length to successfully complete a curing operation, and have an improved lamp life. Additional advantages of UV-LED devices is less heat generated and lower surface temperatures of machine components, thereby resulting in increased safety for machine operators and maintenance personnel. Accordingly, the use of UV-LED devices in the ultraviolet bottom coating system described herein facilitates enhancing can production in an efficient, safe, and cost-effective manner.

As used herein, the term "can" refers to one-piece or fully assembled multi-piece metallic cans, and to the container portion of multi-piece metallic cans to be used as a precursor in the manufacture of fully assembled multi-piece metallic cans.

Figure 1:
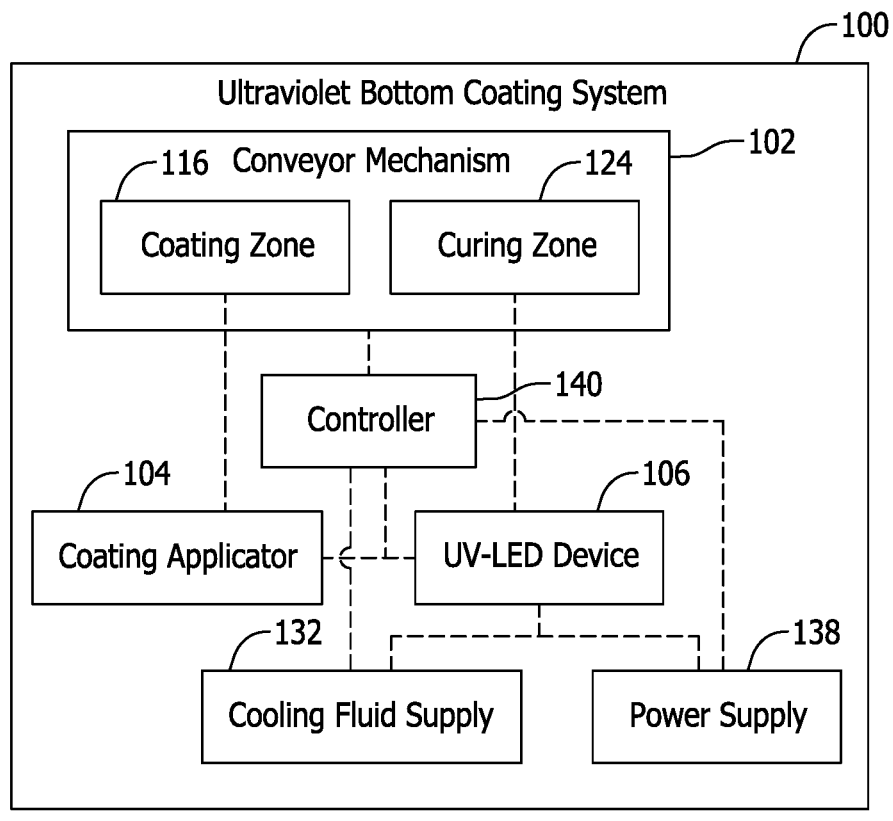
FIG. 1 is a block diagram illustrating an exemplary ultraviolet bottom coating system.
Figure 2:
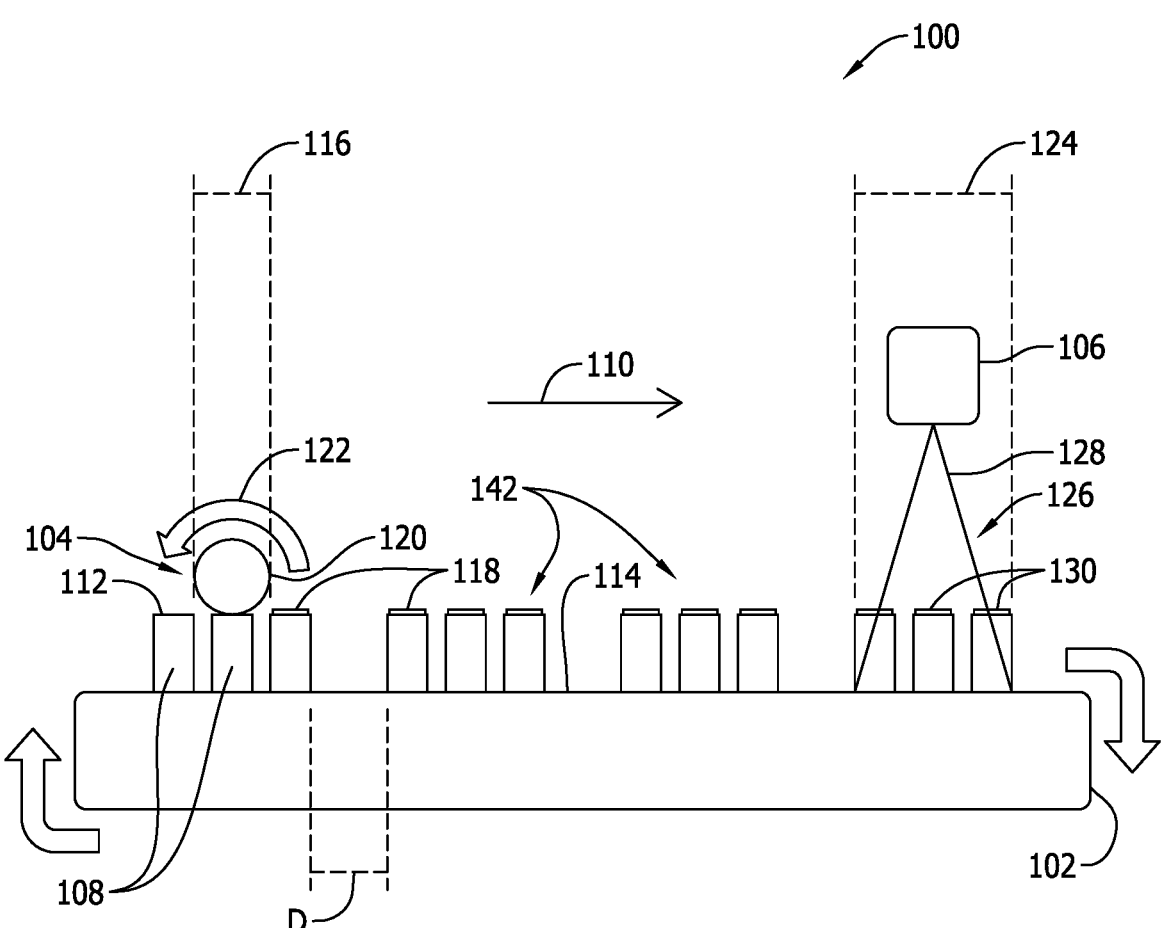
FIG. 2 is a side view schematic illustration of the ultraviolet bottom coating system shown in FIG. 1.

FIG. 1 is a block diagram illustrating an exemplary ultraviolet bottom coating system 100, and FIG. 2 is a side view schematic illustration of ultraviolet bottom coating system 100. Ultraviolet bottom coating system 100 may be a standalone unit that is assembled off-line and incorporated into a manufacturing line (not shown), or may be integrated as part of the manufacturing line itself. System 100 may also be incorporated as part of a new assembly, or is retrofittable into an existing assembly to upgrade its curing system. In the exemplary embodiment, ultraviolet bottom coating system 100 includes a conveyor mechanism 102, a coating applicator 104, and at least one UV-LED device 106. As illustrated in FIG. 2, conveyor mechanism 102 routes a plurality of cans 108 in a machine direction 110. Cans 108 may be manufactured along the manufacturing line and then delivered to conveyor mechanism 102 in any suitable orientation. As illustrated, cans 108 each have a bottom surface 112, and cans 108 are inverted on conveyor mechanism 102 to orient bottom surface 112 upwards. In such an embodiment, conveyor mechanism 102 has a continuous work surface 114 receives cans 108 thereon, and work surface 114 is rotatable by a track system that imparts motion using pulleys, rollers, and the like. Alternatively, cans 108 may be held on conveyor mechanism 102 with a holding member (not shown) associated with each can 108. Accordingly, cans 108 may be oriented in any direction on conveyor mechanism 102 that enables ultraviolet bottom coating system 100 to function as described herein.

Coating applicator 104 defines a coating zone 116 on conveyor mechanism 102. In operation, coating applicator 104 is oriented above conveyor mechanism 102 to apply uncured coating material 118 directly across the bottom surface 112 of the inverted plurality of cans 108 routed through coating zone 116. Coating applicator 104 may be any device that enables ultraviolet bottom coating system 100 to function as described herein. As shown in FIG. 2, coating applicator 104 is a roller 120, that may be covered with an elastomeric material, that is supplied with uncured coating material 118, and that contacts bottom surface 112 of the plurality of cans 108 routed through coating zone 116 to deposit uncured coating material 118 thereon. For example, roller 120 may be rotatable in a rotational direction 122 as cans 108 are routed through coating zone 116. In an alternative embodiment, coating applicator 104 is a spray device oriented to discharge atomized uncured coating material towards conveyor mechanism 102. Coating zone 116 is thus defined by the dimensions of roller 120, or by a discharge field of view of the spray device.

Any type of uncured coating material 118 may be applied to bottom surface 112 of cans 108 that enables ultraviolet bottom coating system 100 to function as described herein. For example, uncured coating material 118 is curable with ultraviolet energy, but does not require thermal energy to be cured. In addition, uncured coating material 118 is curable with less than about 500 mJ/cm$^2$ of energy, is curable in conjunction with or solely with UV-A radiation, and produces a clear finish when cured.

UV-LED device 106 is downstream from coating applicator 104, relative to conveyor mechanism 102, in machine direction 110. UV-LED device 106 defines a curing zone 124 on conveyor mechanism 102. In operation, UV-LED device 106 emits ultraviolet radiation 126 towards the plurality of cans 108 to cure uncured coating material 118 onto bottom surface 112. For example, ultraviolet radiation 126 emitted from UV-LED device 106 defines a field of view 128 across conveyor mechanism 102, and field of view 128 defines curing zone 124. Uncured coating material 118 is reactive with, and is facilitated to be cured by, ultraviolet radiation 126. As such, cans 108 routed through and then discharged from curing zone 124 have a cured rim coat 130 formed on bottom surface 112 thereof.

Figure 3:
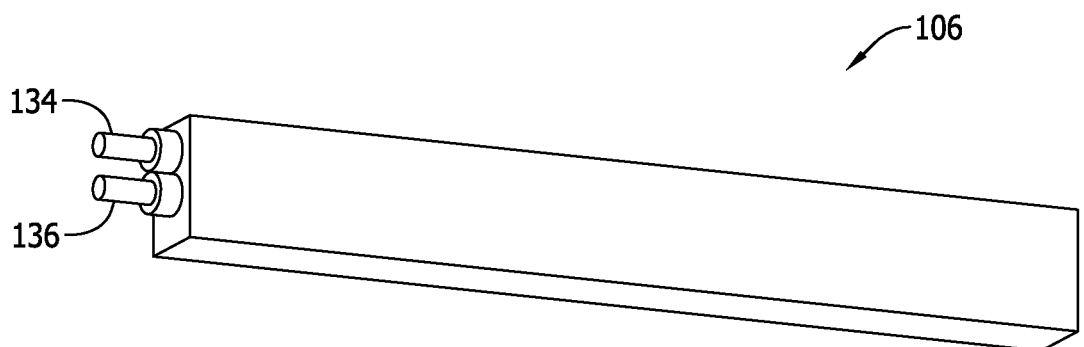
FIG. 3 is a perspective view of an exemplary ultraviolet light-emitting diode device that may be used in the ultraviolet bottom coating system shown in FIG. 1.

In the exemplary embodiment, UV-LED device 106 is a liquid-cooled or an air-cooled device. For example, referring to FIG. 1, ultraviolet bottom coating system 100 includes a cooling fluid supply 132 that supplies cooling fluid, such as water or air, to UV-LED device 106. Referring to FIG. 3, UV-LED device 106 includes an inlet port 134 and an outlet port 136 coupled in communication with cooling fluid supply 132. In operation, cooling fluid is channeled into UV-LED device 106 via inlet port 134, heat generated by UV-LED device 106 is transferred to the cooling fluid channeled therethrough, and the heated cooling fluid is discharged from UV-LED device 106 via outlet port 136. As such, UV-LED device 106 has operating parameters that facilitate enhancing can production in an efficient, safe, and cost-effective manner.

For example, UV-LED device 106 is operable to emit ultraviolet radiation 126 at a power output defined within a range between about 2 Watts per square centimeter (W/cm$^2$) and about 24 W/cm$^2$, thereby enabling can production (e.g., curing) at production speeds of greater than about 80 feet per minute. In one embodiment, UV-LED device 106 emits ultraviolet radiation 126 therefrom having a wavelength defined within a range between about 200 nanometers (nm) and about 400 nm. Alternatively, UV-LED device 106 emits ultraviolet radiation 126 therefrom having a wavelength defined within a range, and only within the defined range, of between about 315 nm and about 400 nm (i.e., the UV-A band of radiation). As such, operators of ultraviolet bottom coating system 100 are not exposed to more harmful bands of ultraviolet radiation, such as the UV-B and UV-C bands of radiation.

Ultraviolet bottom coating system 100 also includes a power supply 138 for providing power to UV-LED device 106. Ultraviolet bottom coating system 100 may include any suitable power supply 138 that enables UV-LED device 106 to function as described herein. For example, power supply 138 may be a direct current power supply having a voltage rating defined within a range between about 40 volts and about 400 volts. In addition, in some embodiments, power supply 138 is equipped with monitoring features that provide signal outputs for input voltage failure, output voltage verification, internal fan failure, over temperature warning, and/or blown fuse indication.

Ultraviolet bottom coating system 100 also includes a controller 140 in communication with conveyor mechanism 102, coating applicator 104, UV-LED device 106, and/or cooling fluid supply 132. In some embodiments, controller 140 controls the production speed of work surface 114 moving in machine direction 110, and the selective activation and deactivation of coating applicator 104 and UV-LED device 106. Cans 108 may be arranged on conveyor mechanism 102, or may be provided to coating zone 116 and curing zone 124, in a spaced apart or non-continuous manner. For example, referring to FIG. 2, the plurality of cans 108 are arranged in a plurality of groupings 142 that are each separated from each other by a distance D in machine direction 110. Groupings 142 may be spaced from each other at regular or irregular intervals in machine direction 110.

In operation, controller 140 facilitates selectively activating and deactivating coating applicator 104 based on a proximity of the plurality of cans 108 to coating zone 116, and facilitates selectively activating and deactivating UV-LED device 106 based on a proximity of the plurality of cans 108 to curing zone 124. UV-LED device 106 is capable of providing an immediate output without a warm-up time. The immediate output may be defined by an activation time for UV-LED device 106 to reach maximum power. The activation time may be less than about 1 second, less than about 0.75 second, less than about 0.5 second, or less than about 0.25 second. Activation of UV-LED device 106 may also be controlled by gradually energizing UV-LED device 106 to maximum power in a duration that is greater than about 1 second.

Controller 140 controls a routing speed for the plurality of cans 108 based on the known activation time and the known distance D between adjacent groupings 142 of cans 108 on conveyor mechanism 102. For example, the routing speed is selected to enhance the production output of ultraviolet bottom coating system 100, while also providing coating applicator 104 and UV-LED device 106 sufficient time to be activated as cans 108 are routed through coating zone 116 and curing zone 124, respectively. As such, coating applicator 104 and UV-LED device 106 may be selectively activated and deactivated by controller 140 to reduce material costs, such as of uncured coating material 118, and to limit energy usage by UV-LED device 106.

Figure 4:
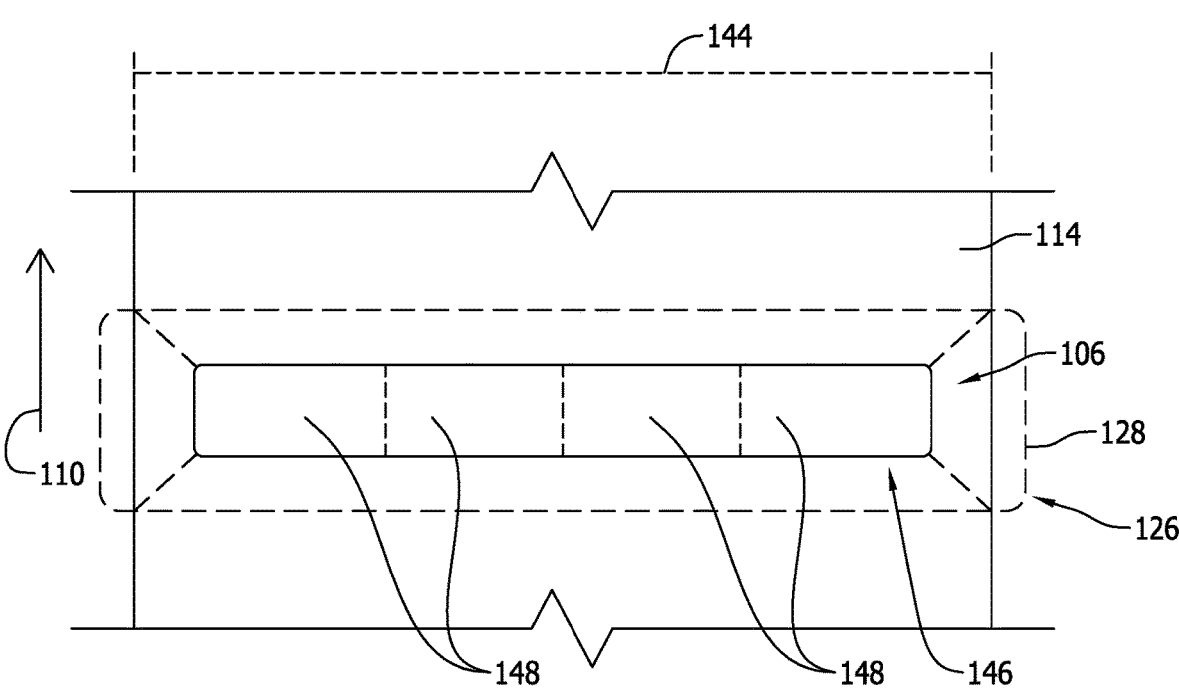
FIG. 4 is a top view schematic illustration of a portion of the ultraviolet bottom coating system shown in FIG. 2.

FIG. 4 is a top view schematic illustration of a portion of the ultraviolet bottom coating system 100 (shown in FIG. 2). In the exemplary embodiment, work surface 114 of conveyor mechanism 102 has a width dimension 144 that is substantially perpendicular to machine direction 110. UV-LED device 106 may be oriented in any direction relative width dimension 144 to provide curing to every can 108 routed through curing zone 124 (both shown in FIG. 2). As shown, UV-LED device 106 is oriented to be substantially perpendicular to machine direction 110 to provide curing to every can 108 routed through curing zone 124. UV-LED device 106 may be a single elongated lighting unit 146. Alternatively, UV-LED device 106 may include multiple lighting units 148, coupled together in series or otherwise, oriented to extend in width dimension 144 across work surface 114.

Figure 5:
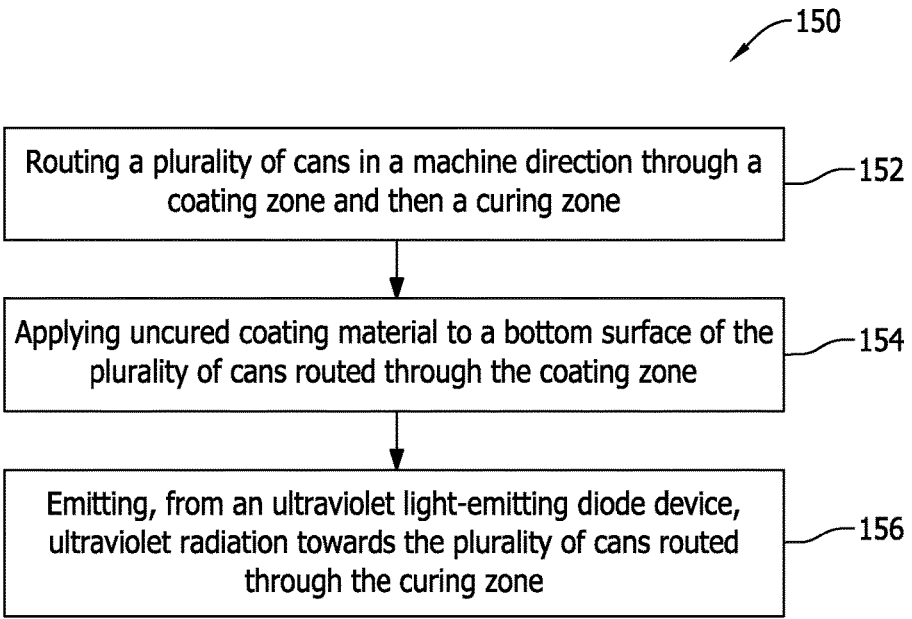
FIG. 5 is a flow diagram illustrating an exemplary method of forming a rim coat on a bottom surface of metallic cans.

FIG. 5 is a flow diagram illustrating an exemplary method 150 of forming a rim coat on a bottom surface of metallic cans. Method 150 includes routing 152 a plurality of cans in a machine direction through a coating zone and then a curing zone, applying 154 uncured coating material to a bottom surface of the plurality of cans routed through the coating zone, and emitting 156, from an ultraviolet light-emitting diode (UV-LED) device, ultraviolet radiation towards the plurality of cans routed through the curing zone.

The embodiments described herein relate to systems and methods for forming a rim coat on a bottom surface of metallic cans. The systems and methods described herein accomplish the aforementioned objective in an efficient, safe, and cost-effective manner by using fluid-cooled UV-LED devices to cure coating material onto the metallic cans and form the rim coat. Thus, the systems and methods described herein enable formation of rim coats onto the bottom surface of metallic cans in a high speed production process.

Exemplary embodiments of ultraviolet bottom coating systems are described above in detail. Although the systems herein are described and illustrated in association with metallic beverage can production, the invention is also intended for use in any production system where UV-curing of coatings onto articles is desired. Moreover, it should also be noted that the components of the invention are not limited to the specific embodiments described herein, but rather, aspects of each component may be utilized independently and separately from other components and methods described herein.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An ultraviolet bottom coating system comprising:
a conveyor mechanism configured to route a plurality of cans in a machine direction, wherein the plurality of cans each have a container portion including a bottom surface and a cylindrical body extending therefrom;
a coating applicator defining a coating zone on the conveyor mechanism, wherein the coating applicator is oriented above the conveyor mechanism to apply the uncured coating material directly across the bottom surface of the plurality of cans as the plurality of inverted cans are routed through the coating zone;
at least one UV-LED (ultraviolet light-emitting diode) device configured to emit ultraviolet radiation only having a wavelength defined within a range between about 315 nanometers (nm) and about 400 nm towards the plurality of cans, wherein the at least one UV-LED device is configured to emit the ultraviolet radiation at a power output defined within a range between about 2 Watts per square centimeter (W/cm$^2$) and about 24 W/cm$^2$, and wherein the conveyor mechanism is configured to orient the bottom surface towards the at least one UV-LED device, and wherein the ultraviolet radiation is configured to cure the uncured coating material onto the bottom surface, such that the cured coating material produces a clear finish on the cans when cured, the at least one UV-LED device comprising a cooling fluid inlet port and a cooling fluid outlet port; and
a cooling fluid supply coupled in communication with the cooling fluid inlet and outlet ports of the at least one UV-LED device to channel a cooling fluid through the at least one UV-LED device.

2. The system in accordance with claim 1, wherein the cooling fluid comprises air or water.

3. The system in accordance with claim 1, wherein the conveyor mechanism comprises a work surface having a width dimension that is perpendicular to the machine direction, wherein the at least one UV-LED device is oriented to provide the ultraviolet radiation across a full width of the work surface in the width dimension.

4. The system in accordance with claim 1, wherein the ultraviolet radiation emitted towards the conveyor mechanism defines a curing zone on the conveyor mechanism, the conveyor mechanism further configured to route the plurality of cans in the machine direction through the curing zone.

5. The system in accordance with claim 1, wherein the at least one UV-LED device is configured for activation to maximum power in less than about 1 second.

6. The system in accordance with claim 1, wherein the cooling fluid comprises water.

7. The system in accordance with claim 1, wherein the at least one UV-LED device has an activation time of less than about 1 second, the system further comprising a controller in communication with the conveyor mechanism and the at least one UV-LED device, the controller configured to:
selectively activate and deactivate the at least one UV-LED device; and

control a routing speed of the conveyor mechanism based on the activation time of the at least one UV-LED device.

8. The system in accordance with claim 1, wherein the coating applicator comprises a roller configured to contact the bottom surface of the plurality of cans routed through the coating zone.

9. The system in accordance with claim 8, wherein the conveyor mechanism comprises a work surface having a width dimension that is perpendicular to the machine direction, wherein the at least one UV-LED device is oriented to provide the ultraviolet radiation across a full width of the work surface in the width dimension.

10. The system in accordance with claim 8, wherein the at least one UV-LED device is configured for activation to maximum power in less than about 1 second.

11. The system in accordance with claim 4, wherein the conveyor mechanism is configured to route the plurality of cans in the machine direction through the curing zone at a routing speed of greater than about 80 feet per minute.

12. The system in accordance with claim 5, wherein the ultraviolet radiation emitted towards the conveyor mechanism defines a curing zone on the conveyor mechanism, the conveyor mechanism further configured to route the plurality of cans in the machine direction through the curing zone at a routing speed of greater than about 80 feet per minute.

13. The system in accordance with claim 7, wherein the controller is configured to control the routing speed of the conveyor mechanism at greater than about 80 feet per minute.

\* \* \* \* \*